US007257549B2

(12) United States Patent
Karaoguz et al.

(10) Patent No.: US 7,257,549 B2
(45) Date of Patent: Aug. 14, 2007

(54) SYSTEMS AND CIRCUITS FOR PROVIDING SUPPORT FOR USER TRANSACTIONS ON A MEDIA EXCHANGE NETWORK

(75) Inventors: Jeyhan Karaoguz, Irvine, CA (US); James D. Bennett, Laguna Beach, CA (US)

(73) Assignee: Broadcom Corporation, Irvine, CA (US)

( * ) Notice: Subject to any disclaimer, the term of this patent is extended or adjusted under 35 U.S.C. 154(b) by 121 days.

(21) Appl. No.: 10/672,852

(22) Filed: Sep. 26, 2003

(65) Prior Publication Data
US 2004/0117269 A1  Jun. 17, 2004

Related U.S. Application Data

(60) Provisional application No. 60/476,276, filed on Jun. 5, 2003, provisional application No. 60/432,472, filed on Dec. 11, 2002, provisional application No. 60/443,894, filed on Jan. 30, 2003.

(51) Int. Cl.
*G06Q 30/00* (2006.01)
*H04N 7/16* (2006.01)

(52) U.S. Cl. ........................................ 705/26; 725/110
(58) Field of Classification Search ................. 705/26, 705/27, 74; 725/25, 28, 6, 100, 131, 110; 235/383, 375
See application file for complete search history.

(56) References Cited

U.S. PATENT DOCUMENTS 5,640,193 A * 6/1997 Wellner ...................... 725/100
6,424,947 B1 * 7/2002 Tsuria et al. .................... 705/1
2003/0028883 A1 * 2/2003 Billmaier et al. ............. 725/46
2003/0097655 A1 * 5/2003 Novak .......................... 725/31
2004/0044627 A1 * 3/2004 Russell et al. ................ 705/50

FOREIGN PATENT DOCUMENTS

EP         1263230 A1 * 12/2002
WO    WO9966436 A1 * 12/1999

OTHER PUBLICATIONS

Walker, Leslie: "Cloaking Devices Designed for Wary Web Shoppers"; The Washington Post [Final Edition][online]; Washington DC; Oct. 19, 2000 [retrieved on Jul. 27, 2005]; p. E. 01 [pp. 1-3] (full text article). Retrieved from the Internet: <URL: http://proquest.umi.com>.*

* cited by examiner

*Primary Examiner*—Jeffrey A. Smith
*Assistant Examiner*—Amee A. Shah
(74) *Attorney, Agent, or Firm*—McAndrews, Held & Malloy

(57) ABSTRACT

A system providing support for user transactions in a media exchange network is disclosed. An embodiment of the present invention may comprise a television display, storage, and a set top box, and may provide an interface device for receiving from a user associated authorization device, information for authorizing user transactions via a communication network. A user transaction may comprise the exchange, purchase, storage, or consumption of media such as, for example, audio, still images, video, and data. The communication network may comprise, for example, a cable infrastructure, a digital subscriber line infrastructure, a wireless infrastructure, and may be the Internet. The system may provide for the completion of the user transaction without divulging the identity of the user to a vendor.

55 Claims, 14 Drawing Sheets

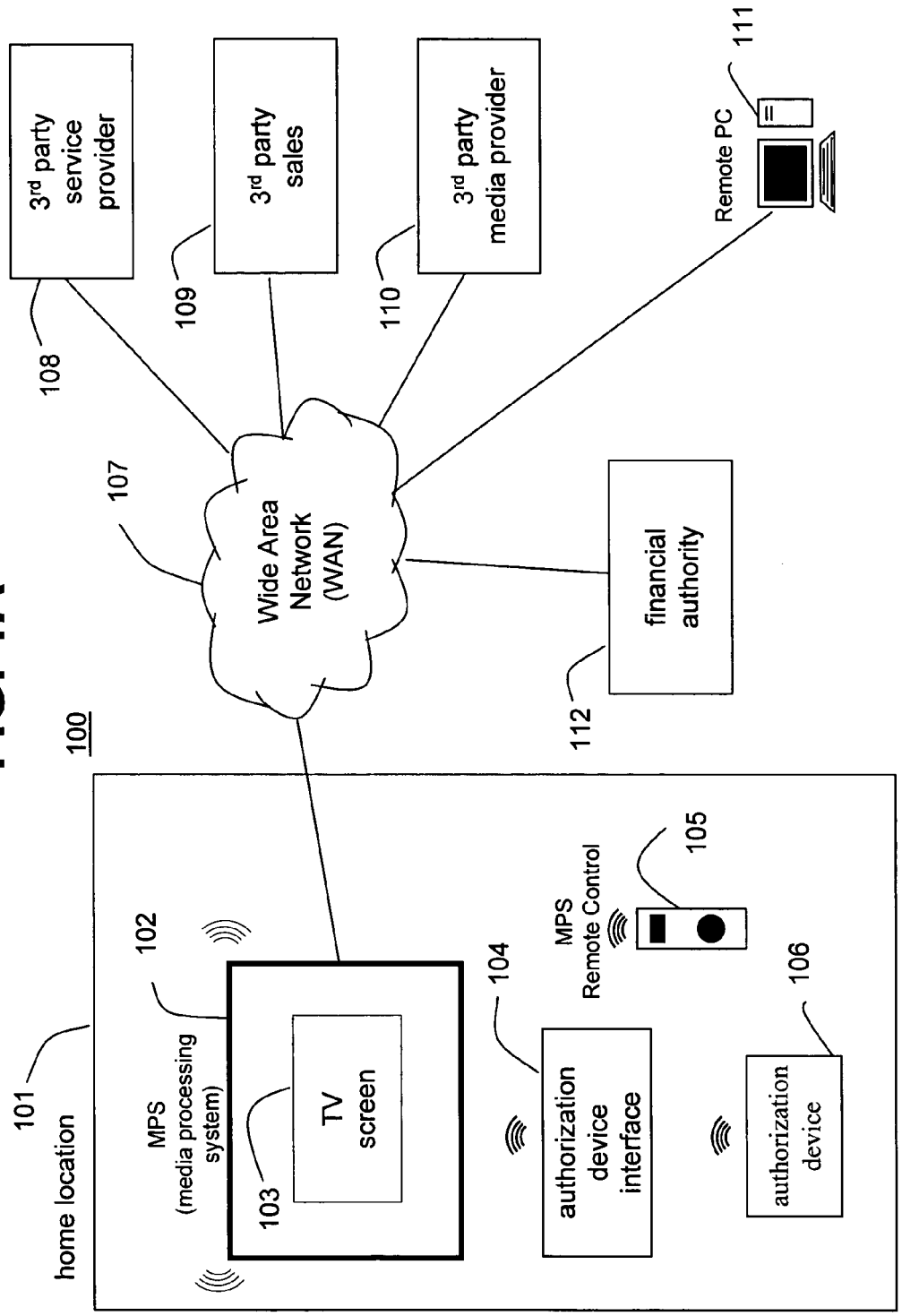

| CHANNEL LINE UP | <<1PM | 2PM | HOUR, DAY ... | 6PM | 7PM-> |
|---|---|---|---|---|---|
| FAMILY VACATIONS | | | | | |
| KID's SPORTS | | | | | |
| ... | | | | | |
| VACATION in ALASKA VIDEO <u>802</u> | Normal Estimated Delivery Time: 2 hrs 13 min Cost: 59c (without Queuing) | | | Showing All Day (48 Min), Earliest Order Time: 4:00PM MPEG-2 1.5 Mbps | |
| VACATION in ALASKA VIDEO <u>803</u> | Express Estimated Delivery Time: 18 min Cost: $1.2 (with Queuing) | | | Showing All Day (48 Min), Earliest Order Time: 4:00PM MPEG-2 4 Mbps | |
| VACATION in ALASKA VIDEO <u>804</u> | Overnight Delivery: Avail. Nxt Morning Cost: 5c (Server Stored) | | | Showing All Day (48 Min), Earliest Order Time: 4:00PM MPEG-2 19 Mbps | |

SYSTEMS AND CIRCUITS FOR PROVIDING SUPPORT FOR USER TRANSACTIONS ON A MEDIA EXCHANGE NETWORK

CROSS-REFERENCE TO RELATED APPLICATIONS/INCORPORATION BY REFERENCE

This application makes reference to, claims priority to, and claims the benefit of U.S. Provisional Patent Application 60/476,276, entitled "Purchasing Peripheral Support In A Media Exchange Network" filed Jun. 5, 2003, U.S. Provisional Patent Application Ser. No. 60/432,472, entitled "Personal Inter-Home Media Exchange Network" filed Dec. 11, 2002, and U.S. Provisional Patent Application Ser. No. 60/443,894, entitled "Personal Access And Control Of Media Peripherals On A Media Exchange Network" filed Jan. 30, 2003, the complete subject matter of which are hereby incorporated herein by reference, in their entirety.

The applicant hereby incorporates the complete subject matter herein by reference, in their entirety, of U.S. Provisional Patent Application Ser. No. 60/457,179, entitled "Server Architecture Supporting A Personal Media Exchange Network" filed Mar. 25, 2003, U.S. patent application Ser. No. 10/657,390, entitled "Personal Inter-Home Media Exchange Network" filed Sep. 8, 2003, and U.S. patent application Ser. No. 10/660,267, entitled "Personal Access And Control Of Media Peripherals On A Media Exchange Network" filed Sep. 11, 2003.

In addition, the applicant hereby incorporates the complete subject matter herein by reference, in its entirety, of U.S. Provisional Patent Application Ser. No. 60/447,190, entitled "Card-Based And Independent Server-Based Billing And Authorization In A Media Exchange Network" filed Feb. 13, 2003.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Consumer goods and services are generally purchased in one of two ways, either on a continuing basis, such as with natural gas, telephone, electric, and cable TV utilities, and newspapers, or as individual purchases as is the case with items such as clothing, food, and household goods and supplies. The establishment of a continuing purchase relationship typically requires the consumer to place a service order and provide personal information in advance of delivery. This personal information allows the vendor to determine the consumer's ability to pay, and to aid in the collection of payment. Individual purchases made in person are typically paid for using cash or checks, or a debit or credit card linked to some form of pre-established account. In some cases a pre-paid card or cash-balance smart card may be used.

Many consumers make individual purchases over the telephone or via the Internet. In these situations, the consumer may establish an account with the vendor in advance or at the time of purchase, and later receive a bill. They may also use a credit or debit card for the purchase by providing the card number to the vendor, later receiving a bill from the credit card company, or statement from their bank. The card information for such purchases is provided verbally over the telephone, or transmitted via a web page. Mistakes sometimes occur in the entry or transfer of the card details to the vendor, and the order may be delayed while correct card information is requested.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Aspects of the present invention may be found in a system providing support for user transactions on a media exchange network. Such a system may comprise a television display for consumption of media, a storage for storing media, and set top box circuitry communicatively coupled to deliver media from the storage to the television display. The storage may have an associated network address. In addition, an embodiment of the present invention may comprise an interface device for receiving from an authorization device associated with a user, information for authorizing a user transaction. The interface device may be communicatively coupled to the set top box circuitry. Such an embodiment may also comprise server software that receives, via a communication network, a request comprising at least one of the associated network address, information identifying the user transaction, and at least a portion of the information for authorizing a user transaction. The server software may respond by enabling the completion of the identified user transaction without divulging the identity of the user to a vendor.

In an embodiment in accordance with the present invention, the media may comprise at least one of audio, a still image, video, real-time video, and data, and consumption may comprise at least one of playing audio, displaying a still image, displaying video, and displaying data. The associated network address may be one of an Internet protocol (IP) address, a media access control (MAC) address, and an electronic serial number (ESN). The communication network may comprise at least one of a cable infrastructure, a satellite network infrastructure, a digital subscriber line (DSL) infrastructure, an Internet infrastructure, an intranet infrastructure, a wired infrastructure, and a wireless infrastructure, and the communication network may be the Internet. The interface device may comprise one of an optical card reader, a magnetic card reader, a radio frequency identification (RFID) interface, an integrated circuit (IC) card interface, a biometric sensing device, and a cellular telephone, and may be communicatively coupled using a wireless coupling mechanism. In an embodiment of the present invention, the wireless coupling mechanism may be at least one of an infrared link and a radio frequency link. In addition, the user transaction may comprise at least one of the storage, exchange, purchase, and consumption of media.

An embodiment in accordance with the present invention may also comprise a remote control communicatively coupled to the set top box circuitry. The remote control may comprise an interface device for receiving user transaction authorization information from an authorization device associated with a user, and the remote control may communicate the user transaction authorization information to the set top box circuitry. The remote control may comprise a scanning device to identify at least one of a product and a service, and the scanning device may be one of an optical scanner and a radio frequency identification (RFID) interface.

Additional aspects of the present invention may be seen in a system providing support for user transactions on a media exchange network. Such a system may comprise a television display for consumption of media, a storage for storing media, set top box circuitry communicatively coupled to deliver media from the storage to the television display, and an interface device for receiving from an authorization device associated with a user, information for authorizing a user transaction. The interface device may be communicatively coupled to the set top box circuitry. An embodiment of the present invention may also comprise server software that receives a request via the communication network, and responds by enabling the completion of the user transaction without divulging the identity of the user to a vendor.

In an embodiment of the present invention, the media may comprise at least one of audio, a still image, video, real-time video, and data, and consumption may comprise at least one of playing audio, displaying a still image, displaying video, and displaying data. The communication network may comprise at least one of a cable infrastructure, a satellite network infrastructure, a digital subscriber line (DSL) infrastructure, an Internet infrastructure, an intranet infrastructure, a wired infrastructure, and a wireless infrastructure. In an embodiment of the present invention, the communication network may be the Internet.

In an embodiment of the present invention, the user transaction may comprise at least one of the storage, exchange, purchase, and consumption of media. The interface device may comprise one of an optical card reader, a magnetic card reader, a radio frequency identification (RFID) interface, an integrated circuit (IC) card interface, a biometric sensing device, and a cellular telephone, and the interface device may be communicatively coupled using a wireless coupling mechanism. In such an embodiment, the wireless coupling mechanism may comprise at least one of an infrared link and a radio frequency link.

In another embodiment of the present invention, the system may comprise a remote control communicatively coupled to the set top box circuitry. The remote control may comprise an interface device for receiving user transaction authorization information from an authorization device associated with a user, and the remote control may communicate the user transaction authorization information to the set top box circuitry. The remote control may also comprise a scanning device to identify at least one of a product and a service. In such an embodiment, the scanning device may comprise one of an optical scanner and a radio frequency identification (RFID) interface.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 1A is a diagram illustrating an exemplary embodiment of a media exchange network in which a media processing system provides purchasing peripheral support, in accordance with various aspects of the present invention.

FIG. 8 is an exemplary illustration of a TV guide channel user interface showing several options of a pushed media in accordance with an embodiment of the present invention.

DETAILED DESCRIPTION OF THE INVENTION

Figure 1B:
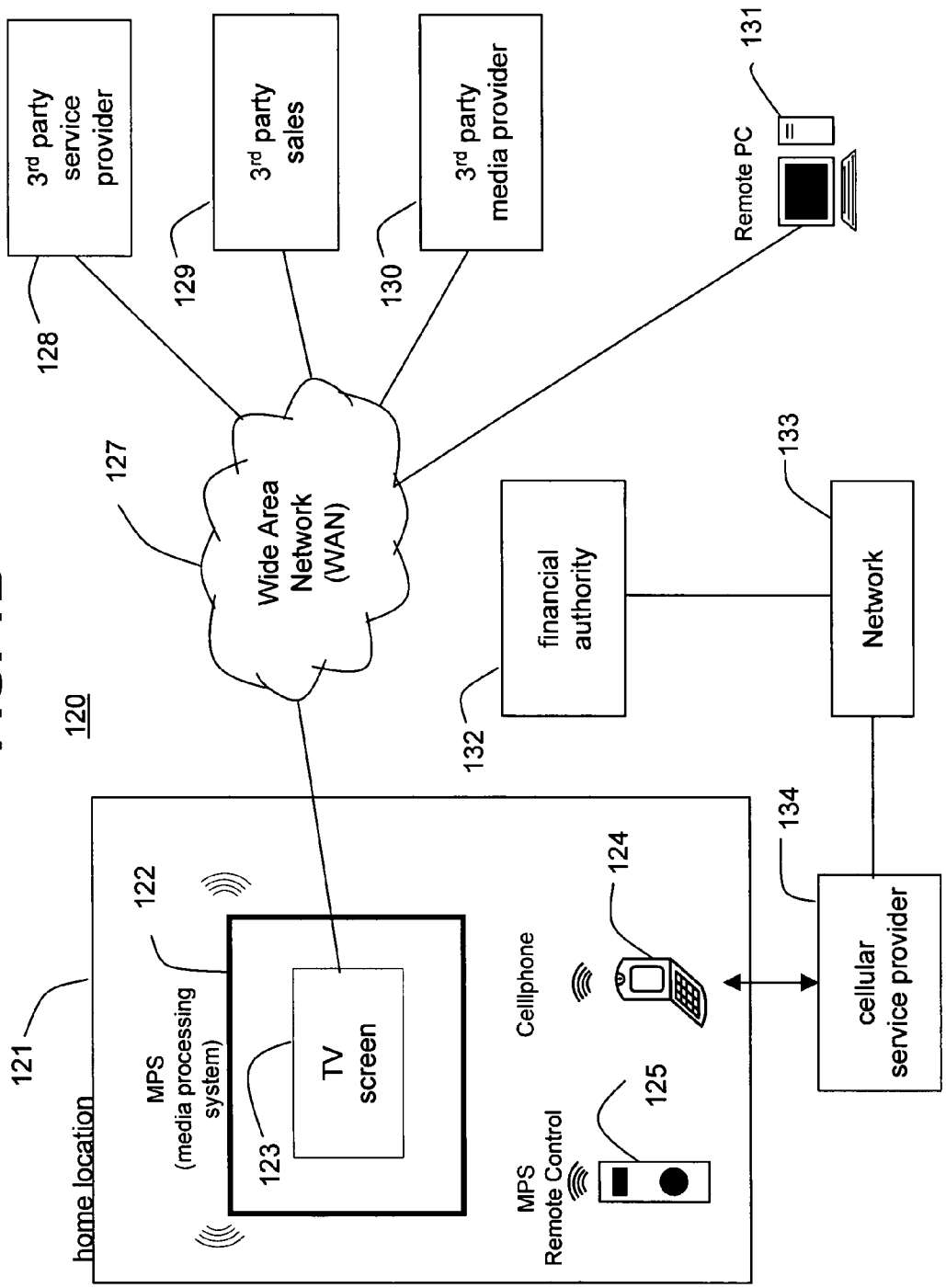
FIG. 1B is a block diagram illustrating another exemplary embodiment of a media exchange network in which a media processing system provides purchasing peripheral support, in accordance with various aspects of the present invention.

Certain embodiments of the present invention relate to providing support for the purchase of goods and services over a communications network. In particular, certain embodiments of the present invention relate to devices and methods that provide for the identification and authorization of, and payment for purchases of goods and services made via a media exchange network.

FIG. 1A is a diagram illustrating an exemplary embodiment of a media exchange network 100 in which a media processing system 102 provides purchasing peripheral support, in accordance with various aspects of the present invention. Specifically, the media exchange network 100 is a communication network comprising a MPS (media processing system) 102 at a home location 101, a $3^{rd}$ third party service provider 108, and a $3^{rd}$ party sales entity 109. The media exchange network 100 of FIG. 1A also comprises a $3^{rd}$ party media provider 110, a remote PC 111, and a financial authority 112. The above elements are interconnected by a wide area network (WAN) 107, that may be a wired or wireless network. The WAN 107 may comprise, for example, cable infrastructure, satellite network infrastructure, digital subscriber line (DSL) infrastructure, Internet infrastructure, intranet infrastructure, wired infrastructure, and wireless infrastructure, in accordance with various embodiments of the present invention.

In the illustration of FIG. 1A, the MPS 102 may be, for example, an enhanced set-top-box, and may include a TV screen 103 for viewing and interacting with various user interfaces, media, data, and services that are available on the media exchange network 100 using, for example, a remote control 105. In the embodiment of FIG. 1A, an authorization device interface 104 located in the vicinity of the MPS 102 is connected to the MPS 102 using either a wired or wireless interface such as, for example, the Bluetooth wireless standard. In an alternate embodiment, the authorization device interface 104 may be integrated within the MPS 102. The authorization device interface 104 interacts with the authorization device(s) 106 using, for example, an optical, magnetic, or radio frequency interface to enable access to and payment for the various products, services and media available on media exchange network 102. The authorization device 106 may be, for example, an optical card, a magnetic stripe pre-paid, debit, or credit card, an integrated circuit (IC)/smart card, or a radio-frequency identification device (RFID). The authorization device 106 may provide to the MPS 102 via the authorization device interface 104 a portion of the authorization information needed for the completion of a purchase transaction. In yet another embodiment of the present invention, a profile containing the authorization information needed for a purchase or other transaction may be stored within the MPS 102. In such an embodiment, the user may only need to enter a single key press using a device such as remote control 105 to initiate a transaction.

In accordance with various embodiments of the present invention, a MPS may comprise a set-top-box (STB), a PC, or a TV with a media management system (MMS). A MMS is also known herein as a media exchange software (MES) platform.

A MMS comprises a software platform operating on at least one processor to provide certain functionality including user interface functionality, distributed storage functionality, and networking functionality. For example, a MMS may provide control of media peripheral devices, status monitoring of media peripheral devices, and inter-home MPS routing selection, in accordance with an embodiment of the present invention.

In yet a further embodiment in accordance with the present invention, the authorization device interface 104 may comprise a biometric sensing device. In such an embodiment, a physical characteristic of the user such as, for example, the relative length of the fingers of a hand, the timing of the entry of a multi-digit string, the result of a retinal scan, a fingerprint, or a sample of the user's voice may act as the authorization for a transaction.

The remote control 105 in the exemplary embodiment illustrated in FIG. 1A permits the user to select and control viewing of materials displayed on the TV screen 103 of the MPS 102. These materials may include, for example, selected live or recorded video or films from $3^{rd}$ party media provider 110, home control, monitoring, and appliance service support from $3^{rd}$ party service provider 108, one or more personal media channels pushed by the remote PC 111, and video advertisements or catalog information from $3^{rd}$ party sales provider 109. For the convenience of the user, the remote control 105 may comprise an authorization device interface, such as authorization device interface 104. By incorporating an authorization device interface into the remote control 105, an embodiment in accordance with the present invention permits the user to make viewing choices, purchase selections, and to authorize payment using a single interface device. In addition, the remote control 105 may comprise a bar code or similar scanner, or a radio frequency identification (RFID) interface, to permit the user to identify product(s)/service(s) for purchase by simply scanning a bar code in an advertisement or catalog, or the UPC or RFID tag on a prior purchased item.

The remote PC 111 may also be used to complete purchase transactions in a manner similar to that used with the MPS 102. In an embodiment in accordance with the present invention, the remote PC 111 may be equipped with an authorization device interface (not shown) such as authorization device interface 104, and may support the same functionality and accept the same complement of authorization device(s) 106 available to the user of the MPS 102. Selections of product(s)/service(s) and purchase transactions from providers accessible via the media exchange network 100 may be made using, for example, a monitor, keyboard, and mouse (not shown) connected to remote PC 111.

FIG. 1B is a block diagram illustrating another exemplary embodiment of a media exchange network 120 in which a media processing system 122 provides purchasing peripheral support, in accordance with various aspects of the present invention. As in FIG. 1A, the media exchange network 120 comprises a MPS 122 at a home location 121, a $3^{rd}$ third party service provider 128, and a $3^{rd}$ party sales entity 129. In addition, the media exchange network 120 of FIG. 1B comprises a $3^{rd}$ party media provider 120, a remote PC 121, and a financial authority 122. A wide area network (WAN) 127 interconnects the MPS 122, the $3^{rd}$ party service provider 128, the $3^{rd}$ party sales provider 129, and the $3^{rd}$ party media provider 130 using wired or wireless communication. As in the example of FIG. 1A, the WAN 127 may comprise, for example, cable infrastructure, satellite network infrastructure, digital subscriber line (DSL) infrastructure, Internet infrastructure, and intranet infrastructure, in accordance with various embodiments of the present invention. Although the authorization device interface 104 and authorization device 106 of FIG. 1A could be present in the embodiment of FIG. 1B, they have been omitted from FIG. 1B for reasons of clarity.

In addition to the elements shown in FIG. 1A, the exemplary embodiment shown in FIG. 1B illustrates a cellular phone 124 in cellular radio communication with cellular service provider 134. The cellular service provider 134 shown in FIG. 1B may provide the user of cellular phone 124 both with conventional voice service, and with a data communication link through network 133 to financial authority 132. The network 133 may be, for example, a wired or wireless network such as the public switched telephone network, an Internet-based network, or an intranet infrastructure. In addition, the cellular phone 124 communicates with the MPS 122 via a radio link, permitting cellular phone 124 to transmit and receive information from MPS 122. The radio link coupling the MPS 122 and the cellular phone 124 may be compliant with, for example, the Bluetooth or WiFi (802.11a/b/g) communication standards. The information transferred between cellular phone 124 and the MPS 122 may be identical to or include, for example, the information exchanged between the remote control 125 and the MPS 122 in accessing 3$^{rd}$ party service provider 128, 3$^{rd}$ part sales provider 129, 3$^{rd}$ party media provider 130, and any other entities accessible through WAN 127. In addition, information may be exchanged between cellular phone 124 and MPS 122 related to the operation of cellular phone 124. This information may include, for example, information related to service and purchase authorizations, cellular operating parameters and feature controls, subscriber directory listings, ring tones, screen savers, and images. Although a cellular phone 124 is illustrated in FIG. 1B, other devices may be used including, for example, a personal digital assistant (PDA), portable PC, etc., without departing from the spirit of the present invention.

Although the example embodiments described above and shown in FIGS. 1A and 1B have demonstrated separate payment authorizations for individual purchase transactions initiated by the user, an embodiment of the present invention may also support the completion of automated transactions such as, for example, payments due for recurring expenses such as cable TV, telephone, natural gas, electricity, and food delivery. In such an arrangement, requests for payment authorization from a product/service provider such as, for example, 3$^{rd}$ party service provider 108 of FIG. 1A or 3$^{rd}$ party sales provider 129 of FIG. 1B, may be provided to the user through the MPS 122 of FIG. 1B, or the remote PC 111 of FIG. 1A. Upon receipt of the payment authorization request, the user may authorize payment on a one-time basis using, for example, authorization device interface 104 and authorization device 106 of FIG. 1A, or cellular phone 124 of FIG. 1B. An embodiment in accordance with the present invention may, for example, allow the user to enable automatic payment authorization by the MPS 122 or by remote PC 131 for specific requests, or all of those received from designated providers.

Figure 2A:
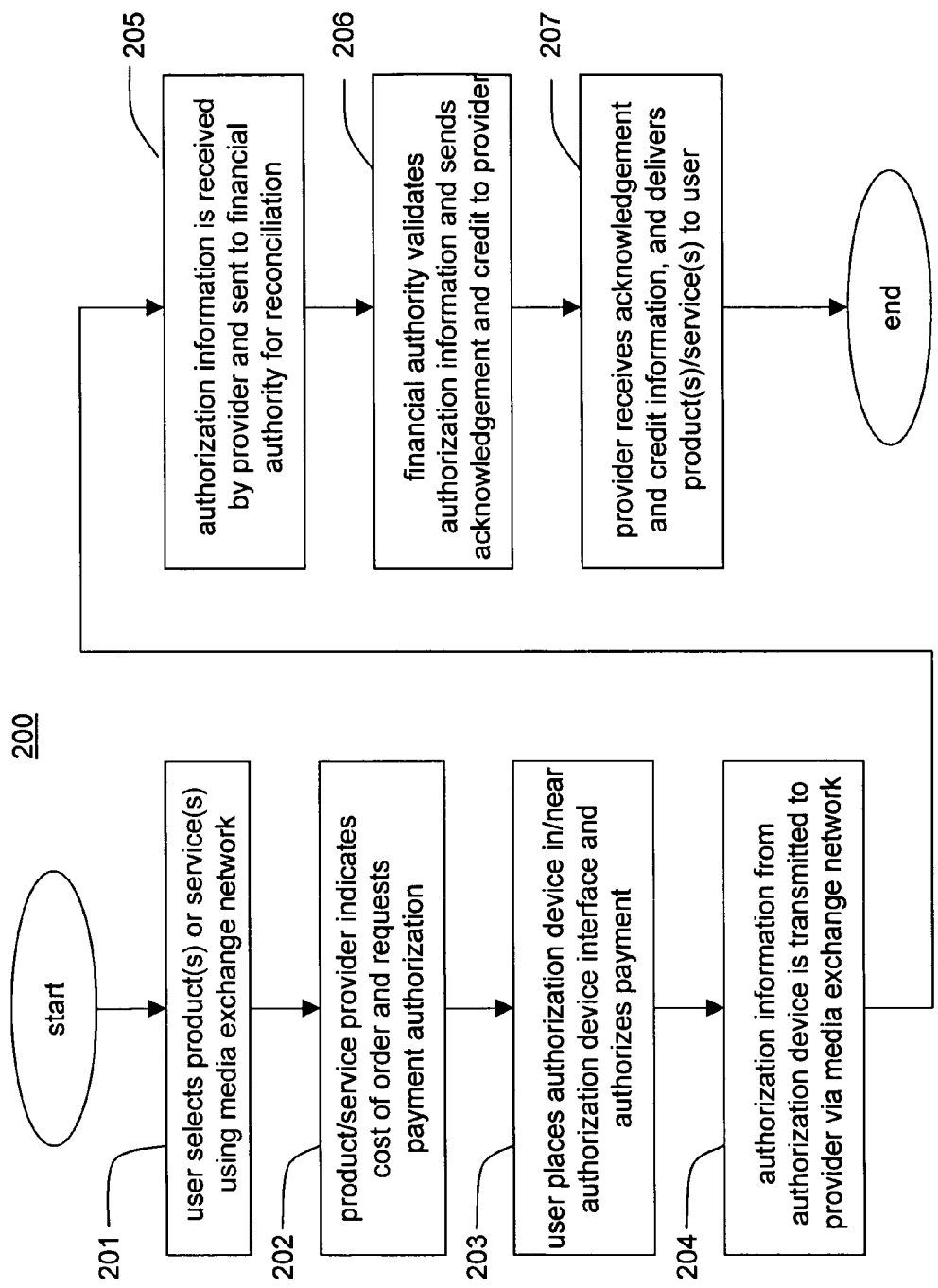
FIG. 2A is a flowchart illustrating an exemplary method of providing purchasing peripheral support in a media exchange network, in accordance with various embodiments of the present invention.

FIG. 2A is a flowchart illustrating an exemplary method of providing purchasing peripheral support in a media exchange network, in accordance with various embodiments of the present invention. In the illustration of FIG. 2A, the user first selects product(s)/service(s) using an MPS and media exchange network such as the MPS 122 and the media exchange network 100 of FIG. 1A (step 201). The provider of the selected product(s)/service(s) then indicates the cost of the order to the user, and requests payment authorization (step 202). Next, the user places an authorization device, such as authorization device 106 of FIG. 1A, in/near the authorization device interface connected to the MPS, and authorizes payment (step 203). Once the authorization device is in/near the authorization device interface and payment has been authorized, the authorization information is transferred from the authorization device to the MPS, and forwarded by the MPS to the provider via the media exchange network (step 204). Upon receipt of the authorization information, the provider transmits the details of the purchase and the authorization information to the financial authority for reconciliation (step 205). The financial authority then validates the purchase and authorization information, and reconciles the transaction, sending an acknowledgement and credit to the provider (step 206). The provider receives the acknowledgement and indication of credit, and delivers the product/service to the user (step 207).

Figure 2B:
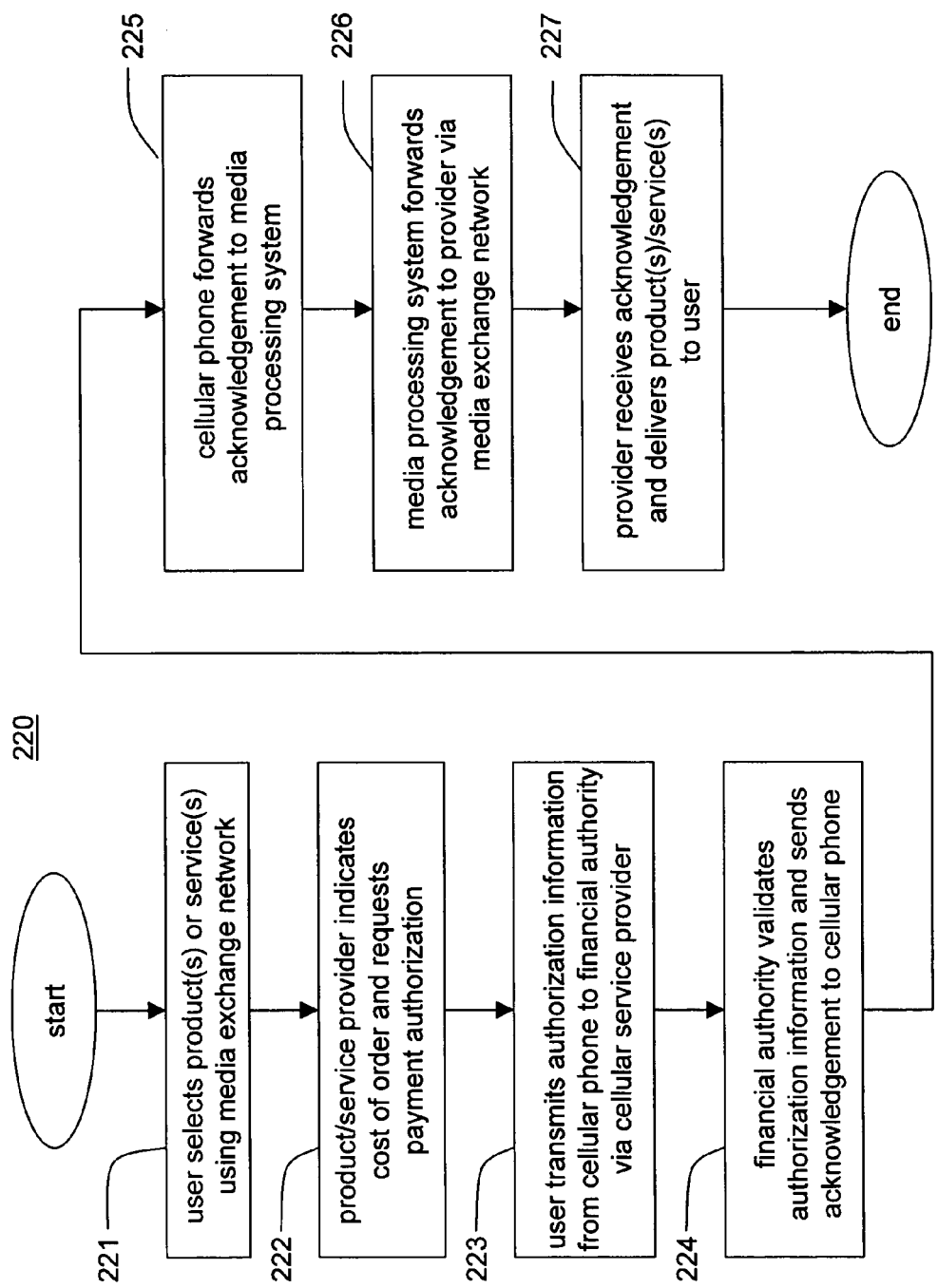
FIG. 2B is a flowchart illustrating yet another exemplary method of providing purchasing peripheral support in a media exchange network, in accordance with an embodiment of the present invention.

FIG. 2B is a flowchart illustrating yet another exemplary method of providing purchasing peripheral support in a media exchange network, in accordance with an embodiment of the present invention. In the illustration of FIG. 2B, a user begins a purchase transaction by selecting the product(s)/service(s) using an MPS and media exchange network, such as the MPS 122 and the media exchange network 120 of FIG. 1B (step 221). The product(s)/service(s) provider then indicates the cost of the product(s)/service(s) to the user, and requests payment authorization (step 222). The user authorizes payment by transmitting authorization information to the financial authority using the cellular phone and the cellular service provider (step 223). Upon receipt, the financial authority validates the authorization information and sends an acknowledgement of payment back to the cellular phone via the cellular service provider (step 224). The cellular phone receives the acknowledgement of payment and forwards it to the media processing system via a radio link to the MPS (step 225). The media processing system then forwards the acknowledgement of payment to the product(s)/service(s) provider via the media exchange network (step 226). Finally, the provider receives the acknowledgement of payment, and delivers the product(s)/service(s) to the user (step 227).

A major challenge is to be able to transfer and share many different types of digital media, data, and services between one device/location and another with ease while being able to index, manage, and store the digital media and data.

For example, it is desirable to be able to distribute and store many types of digital media in a PC and/or television environment in a user-friendly manner without requiring many different types of software applications and/or unique and dedicated interfaces. Any networking issues or other technical issues should be transparent to the users. It is also desirable to take advantage of existing hardware infrastructure, as much as possible, when providing such capability.

In an embodiment of the present invention, a media exchange network is provided that enables many types of digital media, data, and/or services to be stored, indexed, viewed, searched for, pushed from one user to another, and requested by users, using a media guide user interface. The media exchange network also allows a user to construct personal media channels that comprise his personal digital media (e.g., captured digital pictures, digital video, digital audio, etc.), request that third-party media channels be constructed from third-party digital media, and access the media channels pushed to him by other users on the media exchange network.

PC's may be used but are not required to interface to the media exchange network for the purpose of exchanging digital media, data, and services. Instead, set-top-boxes or integrated MPS's (media processing systems) may be used with the media exchange network to perform all of the previously described media exchange functions using a remote control with a television screen.

Current set-top-boxes may be software enhanced to create a MPS that provides full media exchange network interfacing and functionality via a TV screen with a TV guide look-and-feel. PC's may be software enhanced as well and provide the same TV guide look-and-feel; Therefore, the media exchange network supports both PC's and MPS's in a similar manner. Alternatively, a fully integrated MPS may be designed from the ground up, having full MPS capability.

In the case of an MPS configuration, the user takes advantage of his remote control and TV screen to use the media exchange network. In the case of a PC configuration, the user takes advantage of his keyboard and/or mouse to use the media exchange network.

An MPS or enhanced PC is effectively a storage and distribution platform for the exchange of personal and third party digital media, data, and services as well as for bringing the conventional television channels to a user's home. An MPS and/or PC connects to the media exchange network via an existing communication infrastructure which may include cable, DSL, satellite, etc. The connection to the communication infrastructure may be hard-wired or wireless.

The media exchange network allows users to effectively become their own broadcasters from their own homes by creating their own media channels and pushing those media channels to other authorized users on the media exchange network, such as friends and family members.

Figure 3:
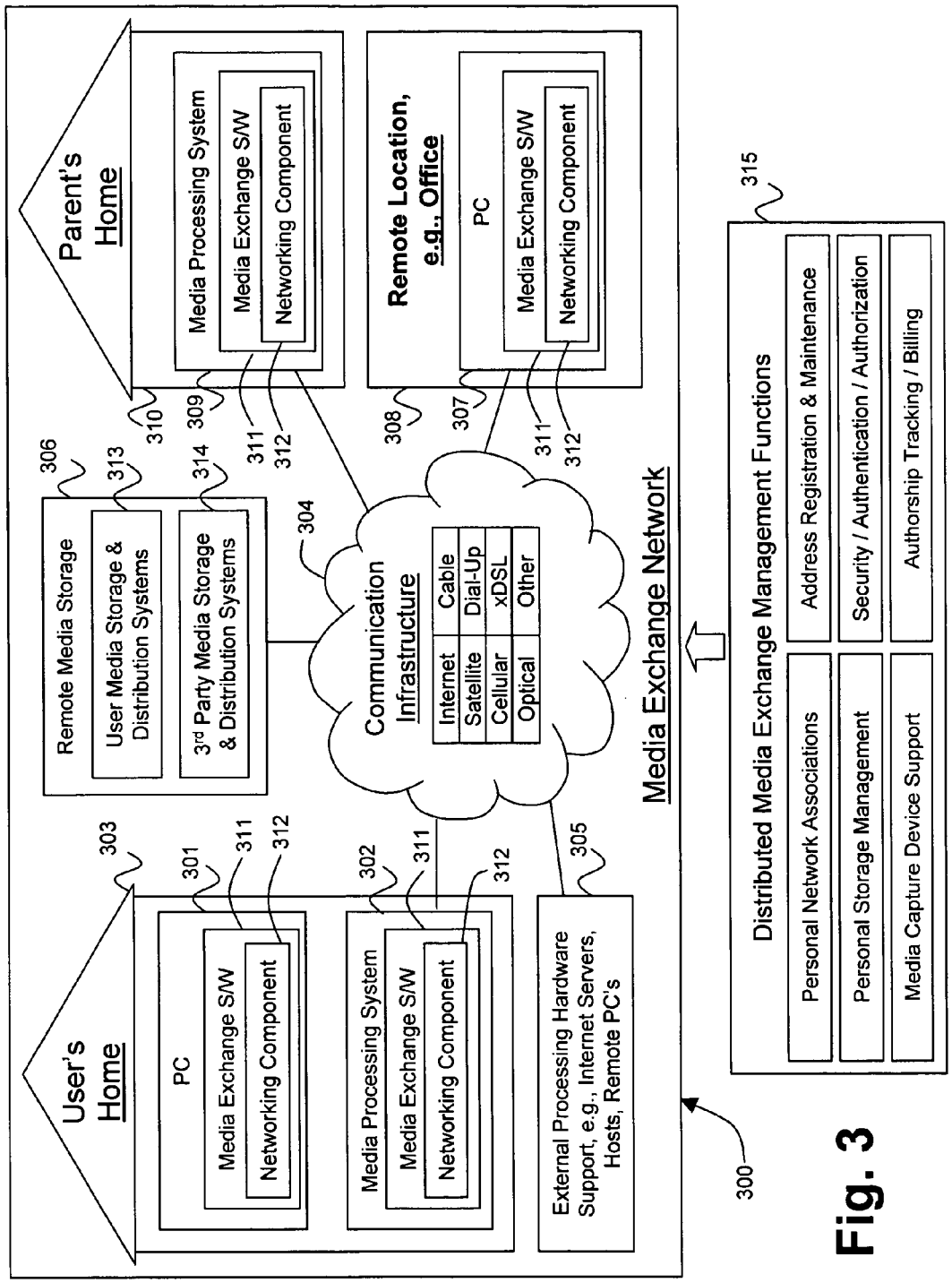
FIG. 3 is a schematic block diagram of a first exemplary media exchange network in accordance with an embodiment of the present invention.

FIG. 3 comprises a media exchange network 300 for exchanging and sharing digital media, data, and services in accordance with an embodiment of the present invention. The media exchange network 300 is a secure, closed network environment that is only accessible to pre-defined users and service providers. The media exchange network of FIG. 3 comprises a first PC 301 and a first media processing system (MPS) 302 at a user's home 303, a communication infrastructure 304, external processing hardware support 305, remote media storage 306, a second PC 307 at a remote location 308 such as an office, and a second MPS 309 at a parent's home 310.

The PC's 301 and 307 and the MPS's 302 and 309 each include a media exchange software (MES) platform 311 and a networking component 312 for connectivity. The MES platform 311 provides multiple capabilities including media "push" capability, media "access" capability, media channel construction/selection, image sequence selection, text and voice overlay, channel and program naming, inter-home routing selection, authorship and media rights management, shared inter-home media experience, billing service, and an integrated media guide interface providing a TV channel guide look-and-feel.

The external processing hardware support 305 comprises at least one server such as a centralized internet server, a peer-to-peer server, or cable head end. The server may alternatively be distributed over various hosts or remote PC's. The MES platform 311 may also reside on the external processing hardware support server 305. The remote media storage 306 may comprise user media storage and distribution systems 313 and/or third party media storage and distribution systems 314.

The communication infrastructure 304 may comprise at least one of internet infrastructure, satellite infrastructure, cable infrastructure, dial-up infrastructure, cellular infrastructure, xDSL infrastructure, optical infrastructure, or some other infrastructure. The communication infrastructure 304 links the user's home 303, parent's home 310, remote media storage 306, and remote location office 308 to each other (i.e., the communication infrastructure 304 links all users and service providers of the media exchange network 300).

The various functions 315 of the media exchange network 300 comprise generating personal network associations, personal storage management, media capture device support, security/authentication/authorization support, authorship tracking and billing and address registration and maintenance. These media exchange management functions 315 may be distributed over various parts of the media exchange network 300. For example, the personal network associations and personal storage management functions may be integrated in the PC 301 at the user's home 303.

Figure 4:
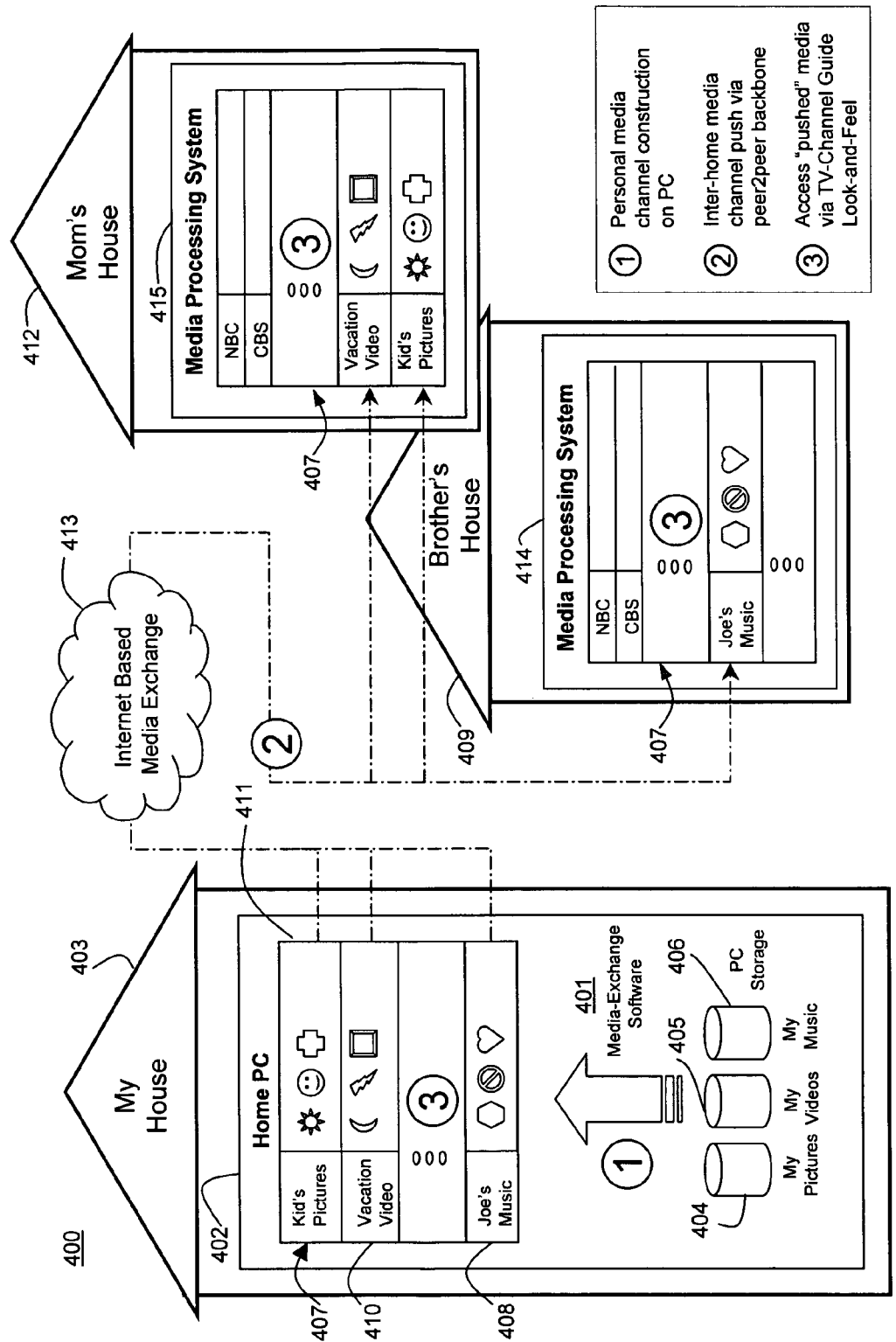
FIG. 4 is a schematic block diagram of performing personal media exchange over a second exemplary media exchange network in accordance with an embodiment of the present invention.

FIG. 4 illustrates an example of personal media exchange over a media exchange network 400 in accordance with an embodiment of the present invention. In step 1, the media exchange software (MES) platform 401 is used to construct personal media channels on a PC 402 by a user at "my house" 403. For example, with various media stored on the PC 402 such as digital pictures 404, videos 405, and music 406, the MES platform 401 allows the digital media to be organized by a user into several channels having a media guide user interface 407 on the PC 402.

In step 2, the user at "my house" 403 pushes a media channel 408 (e.g., "Joe's Music") to "brother's house" 409 and pushes two media channels 410 and 411 (e.g., "Vacation Video" and "Kid's Pictures") to "Mom's house" 412 via a peer-to-peer server 413 over the internet-based media exchange network 400. "Brother's house" 409 includes a first MPS 414 connected to the media exchange network 400. "Mom's house" 412 includes a second MPS 415 connected to the media exchange network 400. The MPS's 414 and 415 also provide a media guide user interface 407.

In step 3, brother and/or Mom access the pushed media channels via their respective media processing systems (MPS's) 414 and 415 using their respective MPS TV screens and remote controls.

Figure 5:
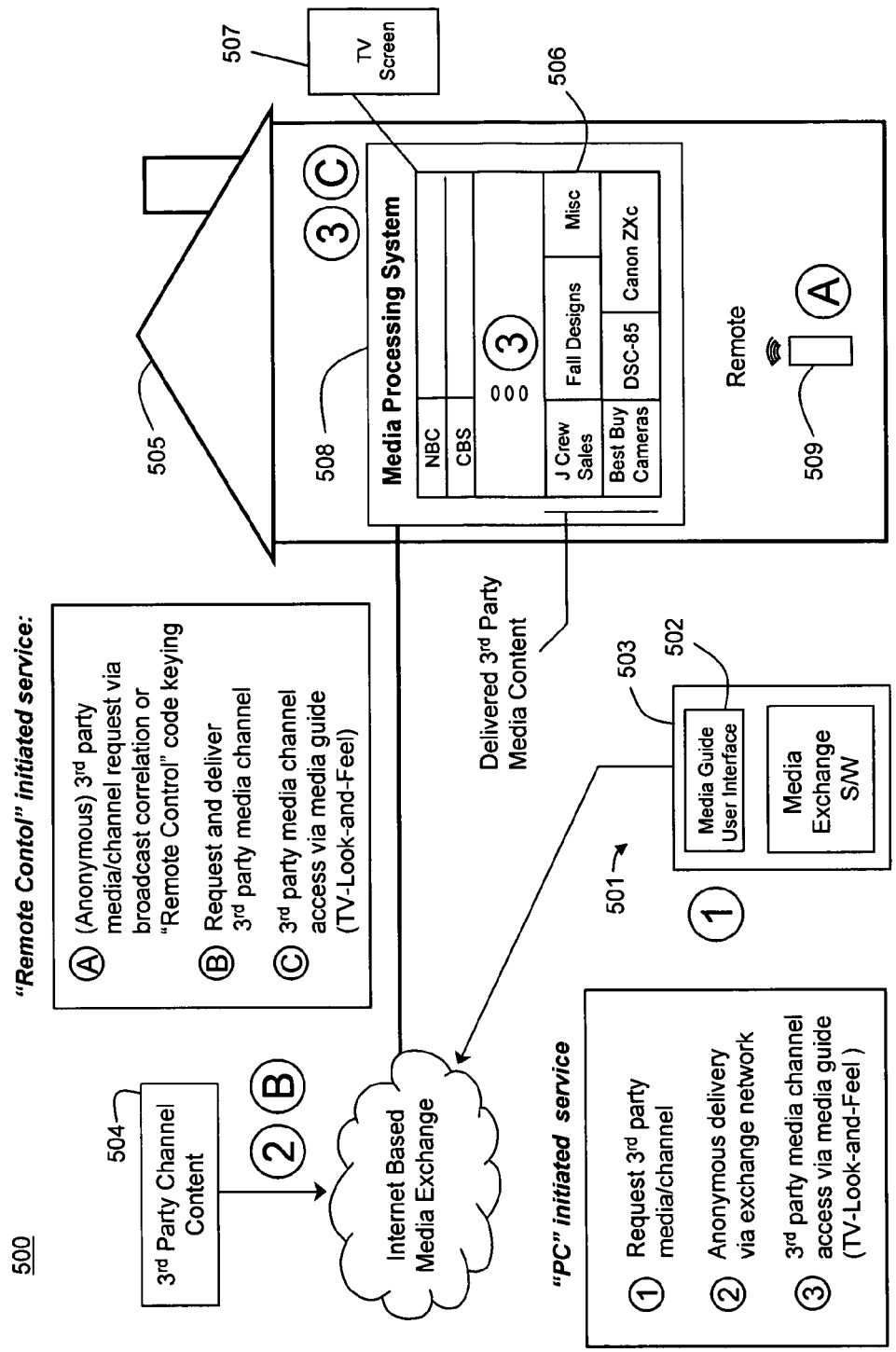
FIG. 5 is a schematic block diagram of performing third-party media exchange over a third exemplary media exchange network in accordance with an embodiment of the present invention.

FIG. 5 illustrates an example of third-party media exchange over a media exchange network 500 in accordance with an embodiment of the present invention. In step 1, a PC-initiated third-party request is made by a first party 501 via an internet-based media exchange network 500 using a media guide user interface 502 on a PC 503. In step 2, an anonymous delivery of the requested third-party channel 504 is made to a second party 505 via the internet-based media exchange network 500. In step 3, the second party 505 accesses the third-party channel 504 using a media guide user interface 506 on a TV screen 507 that is integrated into an MPS 508.

Similarly, in step A, an MPS-initiated third-party request is made by a second party 505 via an internet-based media exchange network 500 using a media guide user interface 506 on a TV screen 507 using a remote control 509. The second party 505 may key in a code, using his remote control 509, that is correlated to a commercial or some other third party broadcast media. In step B, an anonymous delivery of the requested third-party channel 504 is made to a first party 501 via the internet-based media exchange network 500. In step C, the first party 501 accesses the third-party channel 504 using a media guide user interface 502 on a PC 503.

Figure 6:
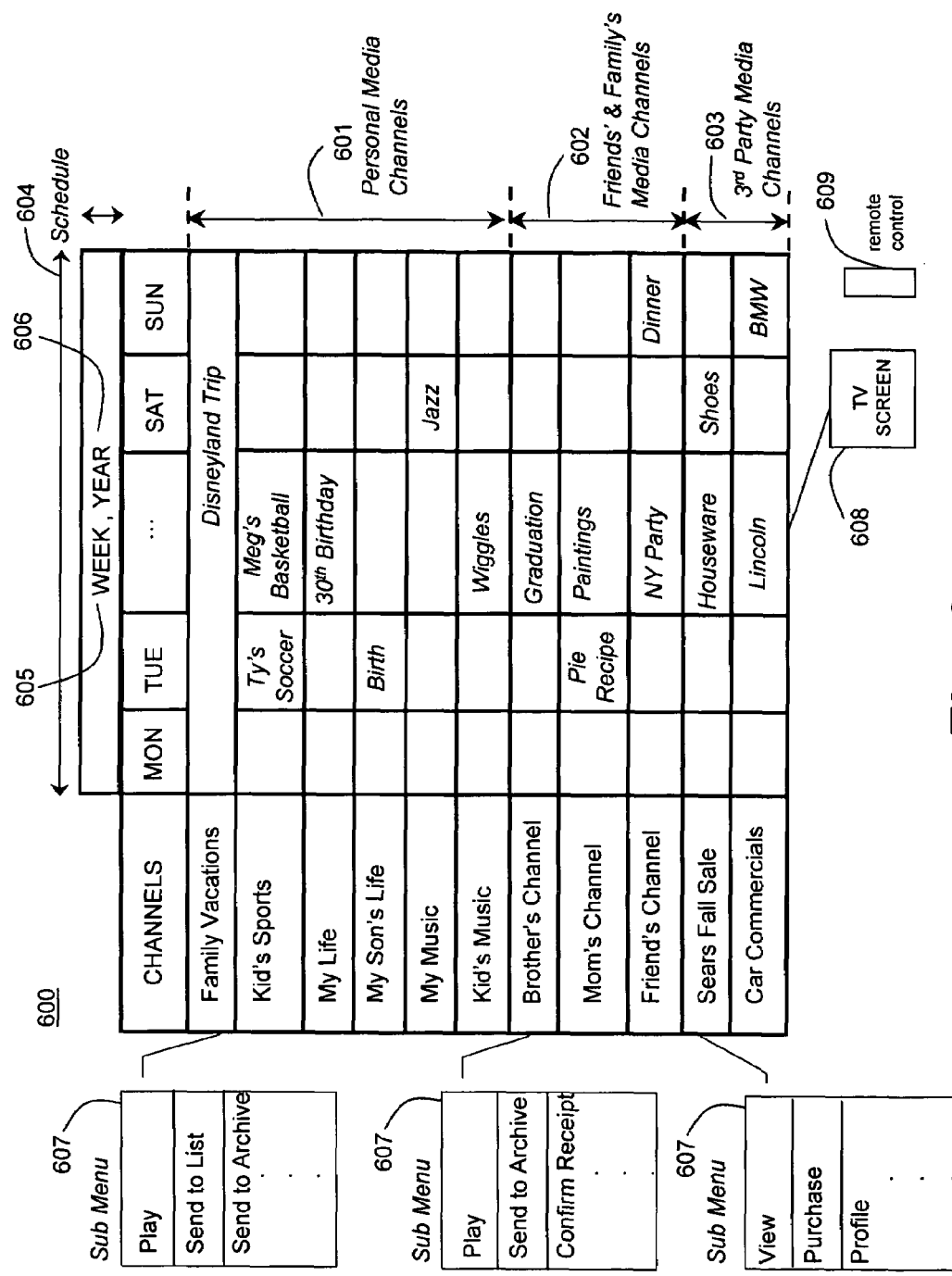
FIG. 6 is an exemplary illustration of a media guide user interface in accordance with an embodiment of the present invention.

FIG. 6 illustrates a media guide user interface 600 in accordance with an embodiment of the present invention. The media guide user interface 600 may be displayed on a TV screen 608 and controlled by a remote control device 609. Also, the media guide user interface 600 may be displayed on a PC monitor and controlled by a keyboard or mouse.

The media guide user interface 600 may be configured not only for conventional TV channels but also for personal media channels 601 that are constructed by a user of a media exchange network, friend's and family's media channels 602 constructed by friends and family, and third party channels 603 that are constructed by third parties either upon request by a user of a media exchange network or based on a profile of a user.

The personal media channels 601 may include, for example, a "family vacations channel", a "kid's sports channel", a "my life channel", a "son's life channel", a "my music channel", and a "kid's music channel". The friends and family media channels 602 may include, for example, a "brother's channel", a "Mom's channel", and a "friend's channel". The third party media channels 603 may include, for example, a "Sears Fall sale channel" and a "car commercials channel".

Each media channel may correspond to a schedule 604 showing, for example, a week 605 and a year 606. For example, under the "kid's sports channel", Ty's soccer game could be scheduled to be viewed on Tuesday of the current week 605 and current year 606. For each media channel, a sub-menu 607 allows for selection of certain control and access functions such as "play", "send to list", "send to archive", "confirm receipt", "view", "purchase", and "profile".

Figure 7:
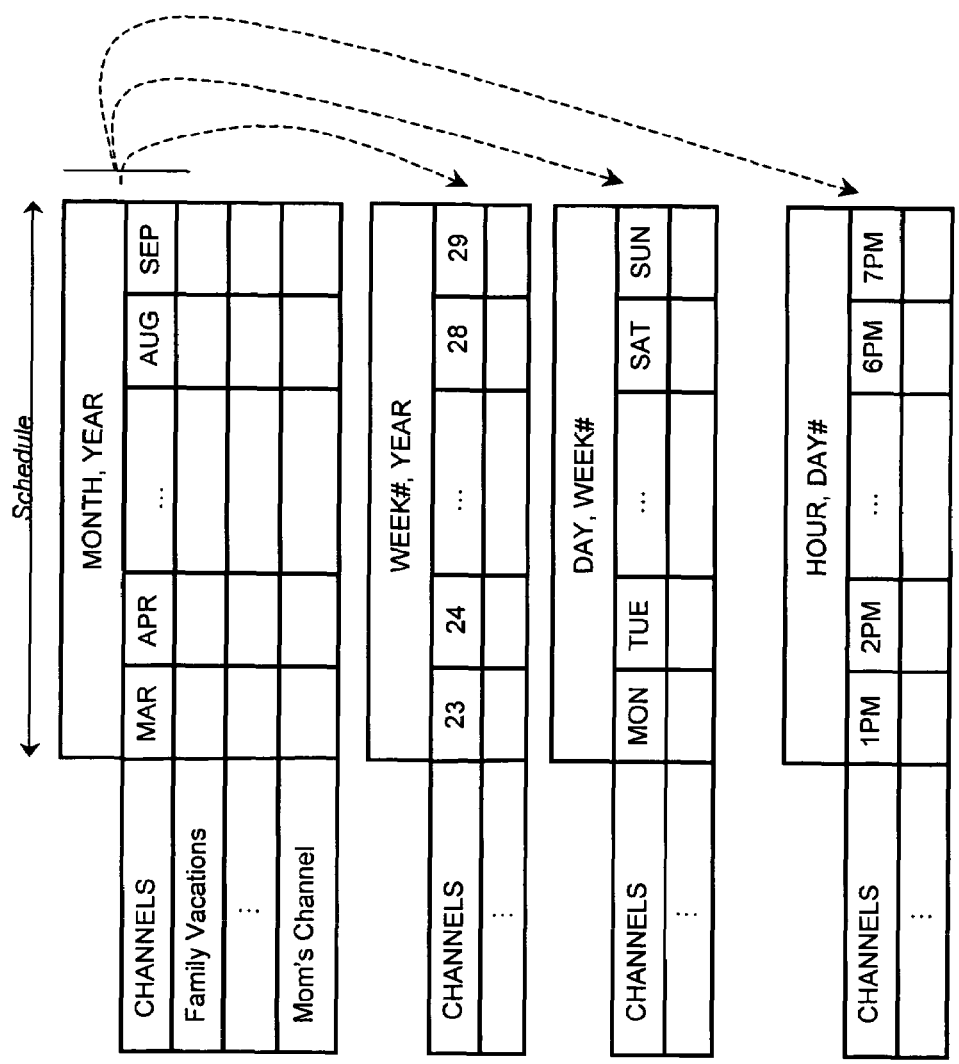
FIG. 7 is an exemplary illustration of several instantiations of a media guide user interface of FIG. 4 in accordance with an embodiment of the present invention.

FIG. 7 illustrates possible multiple instantiations of a media guide user interface 700 in accordance with an embodiment of the present invention. The media guide user interface 700 may be viewed with a schedule having formats of, for example, "month, year", "week#, year", "day, week#", or "hour, day".

Referring to FIG. 8, a user of a media exchange network may push a media channel (e.g., "Vacation in Alaska Video") to a friend who is on the same media exchange network. The media guide user interface 800 may give the friend several options 801 for how to accept and download the pushed media in accordance with an embodiment of the present invention.

For example, a first, most expensive option 803 may be "Express Delivery" which would deliver the pushed media to the friend in 18 minutes using queuing and cost $1.20, for example. The pushed media may be stored in a file in an MPEG 2 format that was recorded at a rate of 4 Mbps, for example. Queuing comprises buffering and delivering a previous part of the media and then buffering and delivering a next part of the media. For example, a first six minutes of the "Vacation in Alaska Video" may be buffered and delivered first, then a second six minutes may be buffered and delivered next, and so on until the entire media is delivered.

A second, less expensive option 802 may be "Normal Delivery" which would deliver the pushed media in 2 hours and 13 minutes without queuing and cost $0.59, for example. The pushed media may be stored in a file in an MPEG 2 format that was recorded at a rate of 1.5 Mbps, for example.

A third, least expensive option 804 may be "Overnight Delivery" which would deliver the pushed media by the next morning and cost only $0.05, for example. The pushed media may be stored in a file in an MPEG 2 format that was recorded at a rate of 19 Mbps and stored on a server, for example.

Figure 9A:
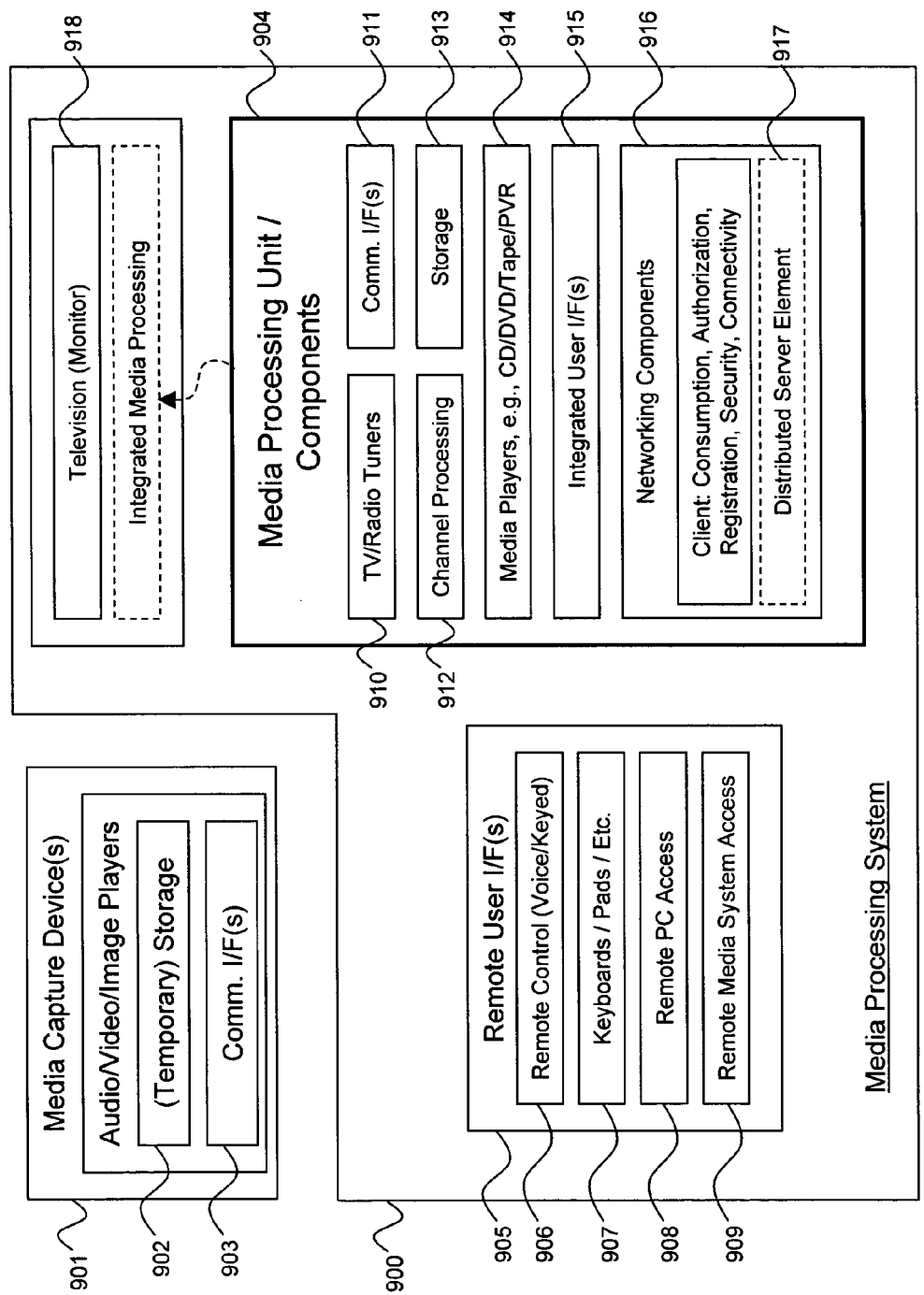
FIG. 9A is a schematic block diagram of a media processing system (MPS) interfacing to media capture peripherals in accordance with an embodiment of the present invention.

FIG. 9A illustrates the detailed elements of a media processing system (MPS) 900 and media capture devices 901 in accordance with an embodiment of the present invention. The media capture devices 901 may comprise audio, video, and image players, such as digital cameras, digital camcorders, and MP3 players, that each include a temporary storage area 902 and a communication interface 903 such as, for example, a USB interface or a wireless interface. The media capture devices 901 have the capability to interface to an MPS and a PC.

The MPS 900 comprises a media processing unit (MPU) 904, remote user interface(s) 905, and a TV screen 918 to provide integrated media processing capability and indirect user interface capability. The remote user interfaces 905 may comprise a voice or keyed remote control 906, keyboards and pads 907, a remote PC access interface 908, and a remote media system access interface 909 (i.e., providing access from another MPS).

The media processing unit (MPU) 904 comprises TV and radio tuners 910 for image and audio consumption, communications interfaces 911, channel processing 912 (creating, storing, indexing, viewing), storage 913, media players 914 (CD, DVD, Tape, PVR, MP3), an integrated user interface 915 (to provide a TV channel guide look-and-feel), networking components 916 to provide client functions such as consumption (billing), authorization (e.g., using digital certificates and digital ID's), registration, security, and connectivity. In an alternative embodiment of the present invention, the networking components 916 may include a distributed server element 917 that is part of a distributed server.

Figure 9B:
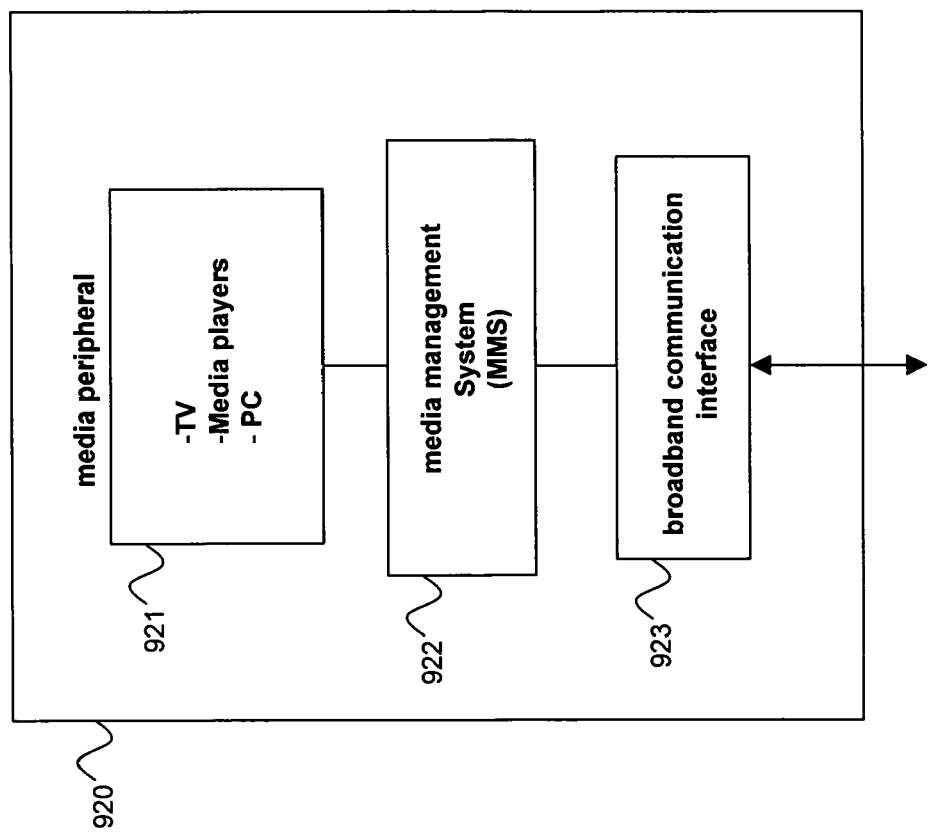
FIG. 9B illustrates an alternative embodiment of a media processing system (MPS) in accordance with various aspects of the present invention.

FIG. 9B illustrates an alternative embodiment of a media processing system (MPS) 920 in accordance with various aspects of the present invention. The MPS 920 is essentially an enhanced set-top-box for viewing and interacting with various user interfaces, media, data, and services that are available on the media exchange network using, for example, a remote control. The MPS 920 comprises a media peripheral 921, a MMS (media management system) 922, and a broadband communication interface 923.

The media peripheral 921 may include a TV (television), a PC (personal computer), and media players (e.g., a CD player, a DVD player, a tape player, and a MP3 player) for video, image, and audio consumption of broadcast and/or personal channels. The broadband communication interface 923 may include internal modems (e.g., a cable modem or DSL modem) or other interface devices in order to communicate with, for example, a cable or satellite headend.

The MMS 922 includes a software platform to provide functionality including media "push" capability, media "access" capability, media channel construction/selection, image sequence selection, text and voice overlay, channel and program naming, inter-home routing selection, authorship and media rights management, shared inter-home media experience, billing service, and a media guide user interface providing an integrated TV channel guide look-and-feel.

Figure 10:
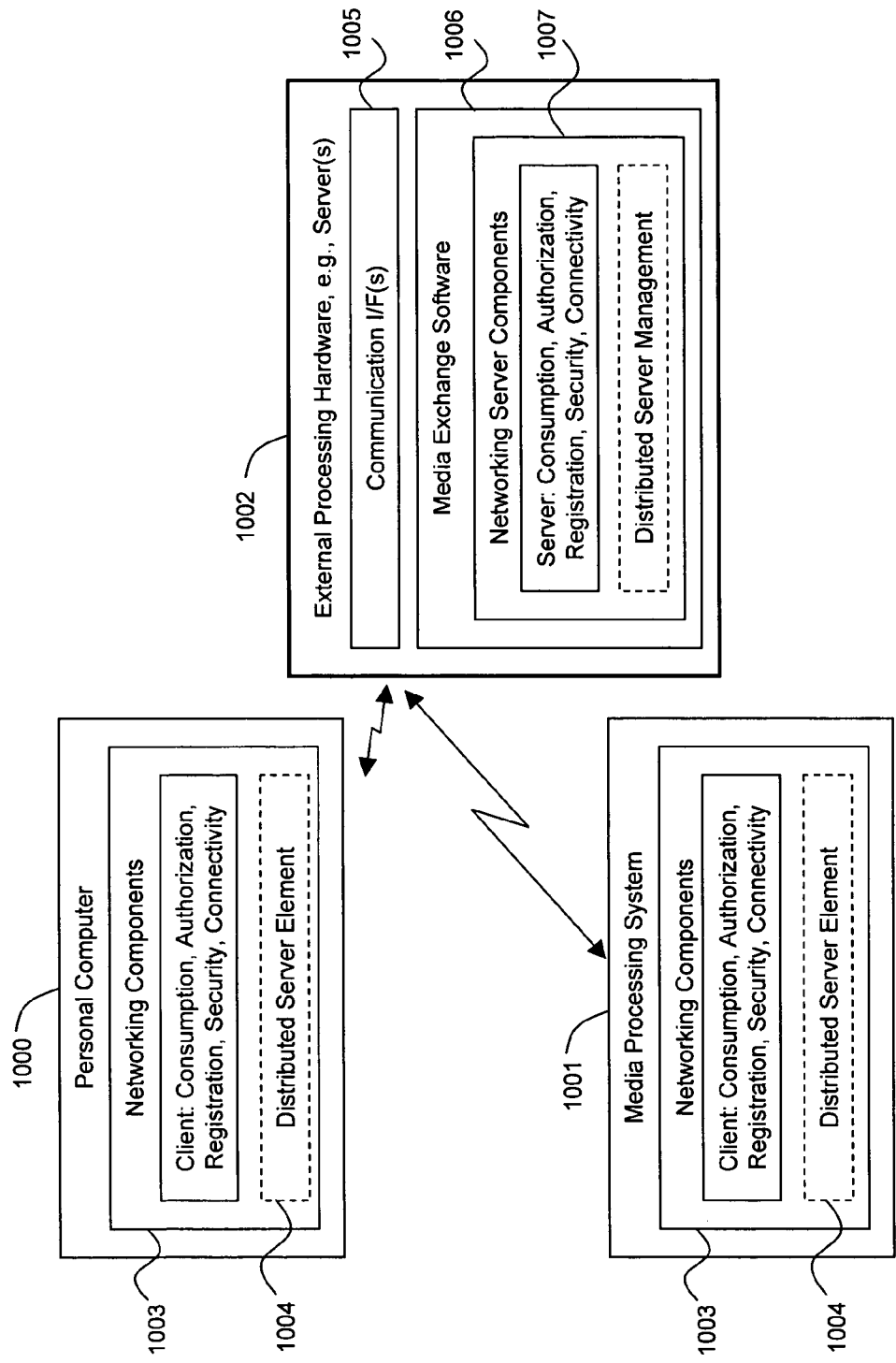
FIG. 10 is a schematic block diagram of a PC and an MPS interfacing to a server on a media exchange network in accordance with an embodiment of the present invention.

FIG. 10 illustrates connectivity between a PC 1000, an MPS 1001, and external processing hardware 1002 (e.g., a server) in accordance with an embodiment of the present invention. The PC 1000 and MPS 1001 include networking components 1003 to provide client functions such as consumption (billing), authorization, registration, security, and connectivity. Alternatively, the PC 1000 and MPS 1001 may include a distributed server element 1004 that is part of a distributed server.

The PC 1000 and MPS 1001 connect to the external processing hardware 1002 via wired or wireless connections. The external processing hardware 1002 comprises a distributed server or peer-to-peer server. The external processing hardware 1002 also comprises communication interfaces 1005 (e.g., cable interfaces, optical interfaces, etc.) and a media exchange software (MES) platform 1006. The MES platform 1006 in the external processing hardware 1002 allows for communication with the PC 1000 and MPS 1001 which may also use the same MES platform 1006. The external processing hardware 1002 also includes networking server components 1007 to provide the similar client functions such as consumption (billing), authorization, registration, security, and connectivity at the server side.

Figure 11:
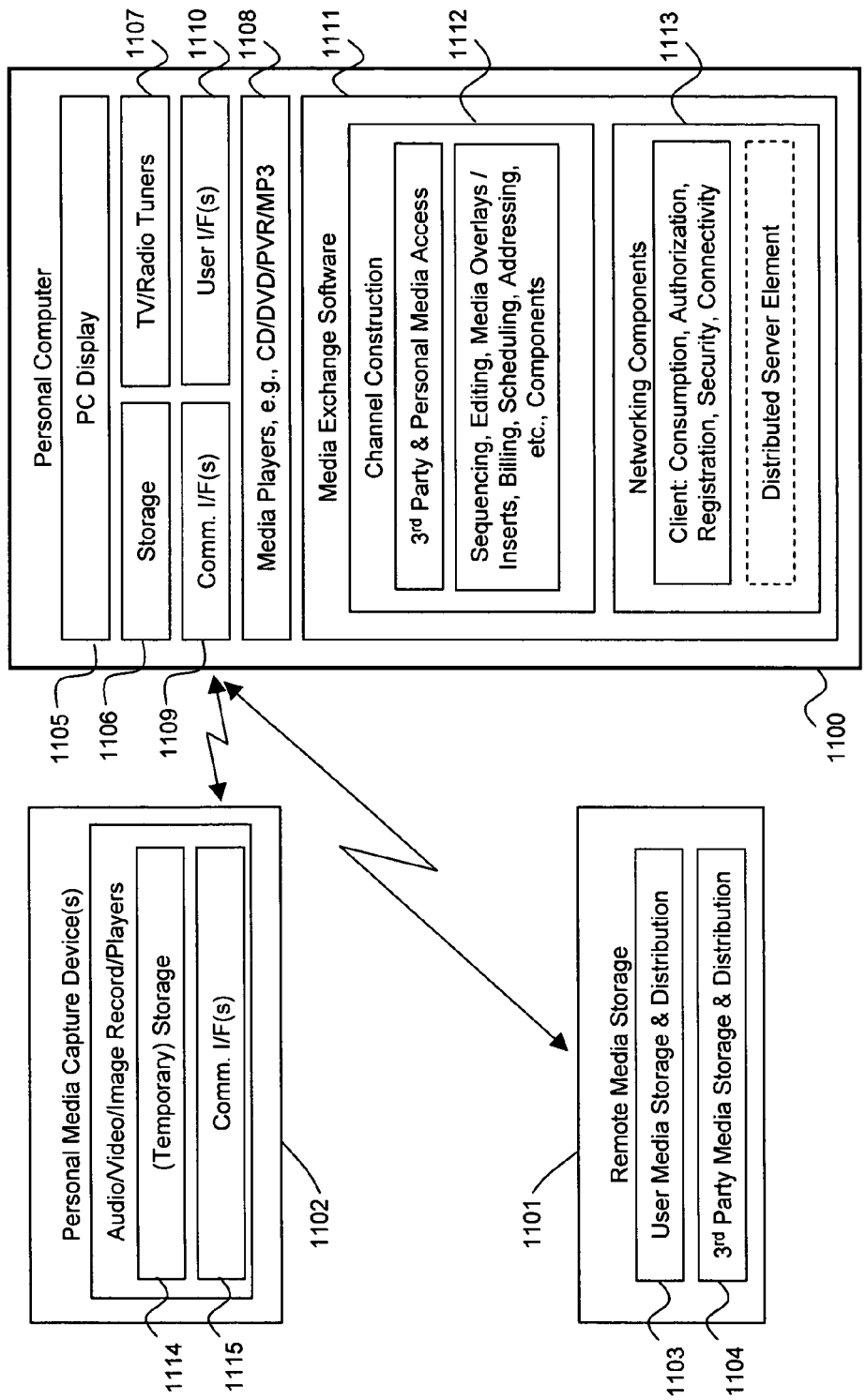
FIG. 11 is a schematic block diagram of a PC interfacing to personal media capture devices and remote media storage on a media exchange network in accordance with an embodiment of the present invention.

FIG. 11 illustrates connectivity between a PC 1100, remote media storage 1101, and personal media capture devices 1102 when the PC 1100 is used as the primary distributor of digital media such as in the case of PC-to-PC operation, in accordance with an embodiment of the present invention. The personal media capture devices 1102 and remote media storage 1101 connect to the PC 1100 via a wireless or wired connection. The remote media storage 1101 provides user media storage and distribution 1103 as well as third party media storage and distribution 1104. The personal media capture devices 1102 provide temporary storage 1114 and communication interfaces 1115.

Viewing is done using a PC monitor 1105 instead of a television screen. The PC 1100 may include storage 1106, TV/radio tuners 1107 for media consumption, media players 1108, and communication interfaces 1109 and user interfaces 1110 similar to those for the MPS of FIG. 9A. The PC 1100 includes a media exchange software (MES) platform 1111 that provides channel construction capability 1112 and networking capability 1113. The channel construction capability 1112 allows third party and personal media access, sequencing, editing, media overlays and inserts, billing, scheduling, and addressing.

Various aspects of the present invention comprise a system and method that provide purchasing peripheral support in a media exchange network.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A system providing support for user transactions on a media exchange network, the system comprising:
    a television display for consumption of media at a first location;
    a storage for storing media, and having an associated network address;
    set top box circuitry at the first location, the set top box circuitry communicatively coupled to deliver media from the storage to the television display;
    an interface device for receiving from an authorization device associated with a first user at the first location, information for authorizing a user transaction, the interface device communicatively coupled to the set top box circuitry; and
    server software that receives a request from the first user of the media exchange network, the request comprising one or more of the associated network address, information identifying the user transaction, and at least a portion of the information for authorizing the user transaction, the server software enables authorization by the first user of a second user of the media exchanae network at a second location so that at least a portion of the authorized user transaction is performed with the second user, via a communication network, without divulging the identity of the first user to the second user.

2. The system of claim 1 wherein the media comprises one or more of audio, a still image, video, real-time video, and data.

3. The system of claim 1 wherein consumption comprises one or more of playing audio, displaying a still image, displaying video, and displaying data.

4. The system of claim 1 wherein the associated network address is one or more of an Internet protocol (IP) address, a media access control (MAC) address, and an electronic serial number (ESN).

5. The system of claim 1 wherein the communication network comprises one or more of a cable infrastructure, a satellite network infrastructure, a digital subscriber line (DSL) infrastructure, an Internet infrastructure, an intranet infrastructure, a wired infrastructure, and a wireless infrastructure.

6. The system of claim 1 wherein the communication network is the Internet.

7. The system of claim 1 wherein the interface device comprises one or more of an optical card reader, a magnetic card reader, a radio frequency identification (RFID) interface, an integrated circuit (IC) card interface, a biometric sensing device, and a cellular telephone.

8. The system of claim 1 wherein the interface device is communicatively coupled to the set top box circuitry using a wireless coupling mechanism.

9. The system of claim 8 wherein the wireless coupling mechanism comprises one or both of an infrared link and a radio frequency link.

10. The system of claim 1 wherein the user transaction comprises one or more of storage, exchange, purchase, and consumption of media.

11. The system of claim 1 comprising:
    a remote control communicatively coupled to the set top box circuitry.

12. The system of claim 11 wherein the remote control comprises the interface device, and wherein the remote control communicates the information for authorizing the user transaction to the set top box circuitry.

13. The system of claim 12 wherein the remote control comprises a scanning device to identify one or both of a product and a service related to the user transaction.

14. The system of claim 13 wherein the scanning device comprises one or both of an optical scanner and a radio frequency identification (RFID) interface.

15. The system of claim 1 wherein the user transaction comprises the purchase of one or both of a good and a service.

16. A system providing support for user transactions on a media exchange network, the system comprising:
    a television display for consumption of media at a first location;
    a storage for storing media;
    set top box circuitry at the first location, the set top box circuitry communicatively coupled to deliver media from the storage to the television display;
    an interface device for receiving from an authorization device associated with a first user at the first location, information for authorizing a user transaction, the interface device communicatively coupled to the set top box circuitry; and
    server software that receives a request from the first user, the server software enables authorization by the first user of a second user of the media exchange network at a second location so that at least a portion of the authorized user transaction is performed with the second user, via a communication network, without divulging the identity of the first user to the second user.

17. The system of claim 16 wherein the media comprises one or more of audio, a still image, video, real-time video, and data.

18. The system of claim 16 wherein consumption comprises one or more of playing audio, displaying a still image, displaying video, and displaying data.

19. The system of claim 16 wherein the communication network comprises one or more of a cable infrastructure, a satellite network infrastructure, a digital subscriber line (DSL) infrastructure, an Internet infrastructure, an intranet infrastructure, a wired infrastructure, and a wireless infrastructure.

20. The system of claim 19 wherein the communication network is the Internet.

21. The system of claim 16 wherein the user transaction comprises one or more of storage, exchange, purchase, and consumption of media.

22. The system of claim 16 wherein the interface device comprises one or more of an optical card reader, a magnetic card reader, a radio frequency identification (RFID) interface, an integrated circuit (IC) card interface, a biometric sensing device, and a cellular telephone.

23. The system of claim 16 wherein the interface device is communicatively coupled to the set top box circuitry using a wireless coupling mechanism.

24. The system of claim 23 wherein the wireless coupling mechanism comprises one or both of an infrared link and a radio frequency link.

25. The system of claim 16 comprising:
a remote control communicatively coupled to the set top box circuitry.

26. The system of claim 25 wherein the remote control comprises the interface device, and wherein the remote control communicates the information for authorizing the user transaction to the set top box circuitry.

27. The system of claim 26 wherein the remote control comprises a scanning device to identify one or both of a product and a service related to the user transaction.

28. The system of claim 27 wherein the scanning device comprises one or both of an optical scanner and a radio frequency identification (RFID) interface.

29. The system of claim 16 wherein the user transaction comprises the purchase of one or both of a good and a service.

30. One or more circuits for use in a set top box in a media exchange network, the one or more circuits comprising:
a display interface operably coupled to a display; and
at least one processor operably coupled to at least one interface for communicating via a broadband communication network, and to storage for storing media and having an associated network address, the at least one processor operable to:
deliver media from the storage to the display at a first location, via the display interface,
receive from an authorization device associated with a first user of the media exchange network at the first location, information for authorizing a user transaction, and
send a request to a server, the request comprising one or more of the associated network address, information identifying the user transaction, and at least a portion of the information for authorizing the user transaction, and wherein the request causes the server to enable authorization by the first user of a second user of the media exchange network at a second location so that at least a portion of the authorized user transaction is performed with the second user, via the broadband communication network without divulging the identity of the first user to the second user.

31. The one or more circuits of claim 30 wherein the media comprises one or more of audio, a still image, video, real-time video, and data.

32. The one or more circuits of claim 30 wherein the associated network address is one or more of an Internet protocol (IP) address, a media access control (MAC) address, and an electronic serial number (ESN).

33. The one or more circuits of claim 30 wherein the broadband communication network comprises one or more of a cable infrastructure, a satellite network infrastructure, a digital subscriber line (DSL) infrastructure, an Internet infrastructure, an intranet infrastructure, a wired infrastructure, and a wireless infrastructure.

34. The one or more circuits of claim 30 wherein the broadband communication network is the Internet.

35. The one or more circuits of claim 30 wherein the authorization device comprises one or more of an optical card, a magnetic card, a radio frequency identification (RFID) device, an integrated circuit (IC) card, a biometric feature of a user, and a cellular telephone.

36. The one or more circuits of claim 30 wherein the authorization device is communicatively coupled to the at least one processor via a wireless coupling mechanism.

37. The one or more circuits of claim 36 wherein the wireless coupling mechanism comprises one or both of an infrared link and a radio frequency link.

38. The one or more circuits of claim 30 wherein the user transaction comprises one or more of storage, exchange, purchase, and consumption of media.

39. The one or more circuits of claim 30 wherein consumption comprises one or more of playing audio, displaying a still image, displaying video, and displaying data.

40. The one or more circuits of claim 30 wherein the at least one processor is operable to:
receive user transaction information from a handheld remote control.

41. The one or more circuits of claim 40 wherein the handheld remote control comprises an interface device for receiving the information for authorizing the user transaction from the authorization device associated with the first user, the remote control communicating the information for authorizing the user transaction to the at least one processor.

42. The one or more circuits of claim 40 wherein the remote control comprises a scanning device to identify one or both of a product and a service related to the user transaction.

43. The one or more circuits of claim 42 wherein the scanning device comprises one or both of an optical scanner and a radio frequency identification (RFID) interface.

44. The one or more circuits of claim 30 wherein the display is a television set.

45. One or more circuits for use in a communication terminal at a first location in a media exchange network, the one or more circuits comprising:
at least one interface for communicating via a communication network; and
at least one processor operably coupled to the at least one interface, the at least one processor having an associated network address and being operable to:
receive from a first user, at the first location, information for authorizing a user transaction,
send a request comprising one or more of the associated network address, information identifying the user transaction, and at least a portion of the information for authorizing the user transaction, to a server, and
cause delivery of media from storage to a communication terminal of a second user at a second location via the communication network, wherein the first user authorizes the second user to communicate with the first user prior to the media delivery without divulging the identity of the first user to the second user.

46. The one or more circuits of claim 45 wherein the communication network comprises one or more of a cable infrastructure, a satellite network infrastructure, a digital subscriber line (DSL) infrastructure, an Internet infrastructure, an intranet infrastructure, a wired infrastructure, and a wireless infrastructure.

47. The one or more circuits of claim 45 wherein the user transaction comprises one or more of storage, exchange, purchase, and consumption of media.

48. The one or more circuits of claim 45 wherein media comprises one or more of audio, a still image, video, real-time video, and data.

49. The one or more circuits of claim 45 wherein the server is located at the first location.

50. The one or more circuits of claim 49 wherein the server is located within the communication terminal at the first location.

51. The one or more circuits of claim 45 wherein the server is located at a third location remote from the first location and the second location.

52. The one or more circuits of claim 45 wherein the storage is located at the first location.

53. The one or more circuits of claim 45 wherein the storage is located at a third location remote from the first location and the second location.

54. The one or more circuits of claim 45 wherein the at least one processor is operable to receive the information for authorizing the user transaction from an authorization device.

55. The one or more circuits of claim 54 wherein the authorization device comprises one or more of an optical card, a magnetic card, a radio frequency identification (RFID) device, an integrated circuit (IC) card, a biometric feature of a user, and a cellular telephone.

* * * * *